(12) United States Patent
Barlow et al.

(10) Patent No.: US 7,607,040 B2
(45) Date of Patent: Oct. 20, 2009

(54) METHODS AND SYSTEMS FOR CONDUCTING PROCESSOR HEALTH-CHECKS

(75) Inventors: Jeff Barlow, Roseville, CA (US); Jeff Brauch, Fort Collins, CO (US); Howard Calkin, Roseville, CA (US); Raymond Gratias, Fort Collins, CO (US); Stephen Hack, Fort Collins, CO (US); Lacey Joyal, Fort Collins, CO (US); Guy Kuntz, Richardson, TX (US); Ken Pomaranski, Roseville, CA (US); Michael Sedmark, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 493 days.

(21) Appl. No.: 11/356,759

(22) Filed: Feb. 17, 2006

(65) Prior Publication Data

US 2006/0230307 A1 Oct. 12, 2006

Related U.S. Application Data

(60) Provisional application No. 60/654,273, filed on Feb. 18, 2005.

(51) Int. Cl.
*G06F 11/00* (2006.01)
(52) U.S. Cl. .............................. 714/10; 714/11; 714/25
(58) Field of Classification Search .................... 714/10, 714/11, 25, 48
See application file for complete search history.

(56) References Cited

U.S. PATENT DOCUMENTS 4,684,885 A * 8/1987 Chapman et al. ............ 714/735
5,649,090 A    7/1997 Edwards
5,954,435 A    9/1999 Yoshida
5,961,653 A    10/1999 Kalter
6,006,311 A    12/1999 Arimilli
6,181,614 B1   1/2001 Aipperspach
6,363,506 B1 * 3/2002 Karri et al. .................. 714/733
6,425,094 B1 * 7/2002 Drogichen et al. ............ 714/41
6,516,429 B1   2/2003 Bossen
6,651,182 B1 * 11/2003 Chang et al. .................... 714/3
6,654,707 B2 * 11/2003 Wynn et al. ................. 702/186
6,708,294 B1   3/2004 Nakao
6,789,048 B2  9/2004 Arndt
6,922,798 B2  7/2005 Nemani
6,954,851 B2 * 10/2005 Natu ............................. 713/2
6,973,604 B2  12/2005 Davis
6,985,826 B2 * 1/2006 Pomaranski et al. ........ 702/120
7,007,210 B2  2/2006 Fields, Jr.
7,047,466 B2  5/2006 Meaney
7,058,782 B2  6/2006 Henderson
7,117,388 B2 * 10/2006 Arimilli et al. ................ 714/10
7,134,057 B1  11/2006 Kaushik
7,155,637 B2  12/2006 Jarboe, Jr.
7,155,645 B1  12/2006 Korhonen
7,321,986 B2  1/2008 Ash
7,350,119 B1  3/2008 Zuraski Jr.
7,409,600 B2  8/2008 Azevedo
7,415,644 B2  8/2008 Bower, III (Continued)

*Primary Examiner*—Marc Duncan

(57) ABSTRACT

Systems and methods for conducting processor health-checks are provided. In one embodiment, a method for evaluating the status of a processor is provided. The method includes, for example, initializing and executing an operating system, de-allocating the processor from the available pool or system resources and performing a health-check on the processor while the operating system is executing.

30 Claims, 6 Drawing Sheets

U.S. PATENT DOCUMENTS

| | | |
|---|---|---|
| 7,418,367 B2 * | 8/2008 | Pomaranski et al. ........ 702/185 |
| 2003/0074598 A1 * | 4/2003 | Bossen et al. .................. 714/6 |
| 2003/0212884 A1 | 11/2003 | Lee |
| 2004/0133826 A1 | 7/2004 | Zhu |
| 2004/0143776 A1 * | 7/2004 | Cox ............................ 714/25 |
| 2004/0221193 A1 | 11/2004 | Armstrong |
| 2005/0096875 A1 * | 5/2005 | Pomaranski et al. ........ 702/185 |
| 2006/0080572 A1 | 4/2006 | Fong |
| 2006/0248394 A1 * | 11/2006 | McGowan ................... 714/30 |
| 2008/0235454 A1 | 9/2008 | Duron |
| 2008/0263394 A1 | 10/2008 | Tanabe |

* cited by examiner

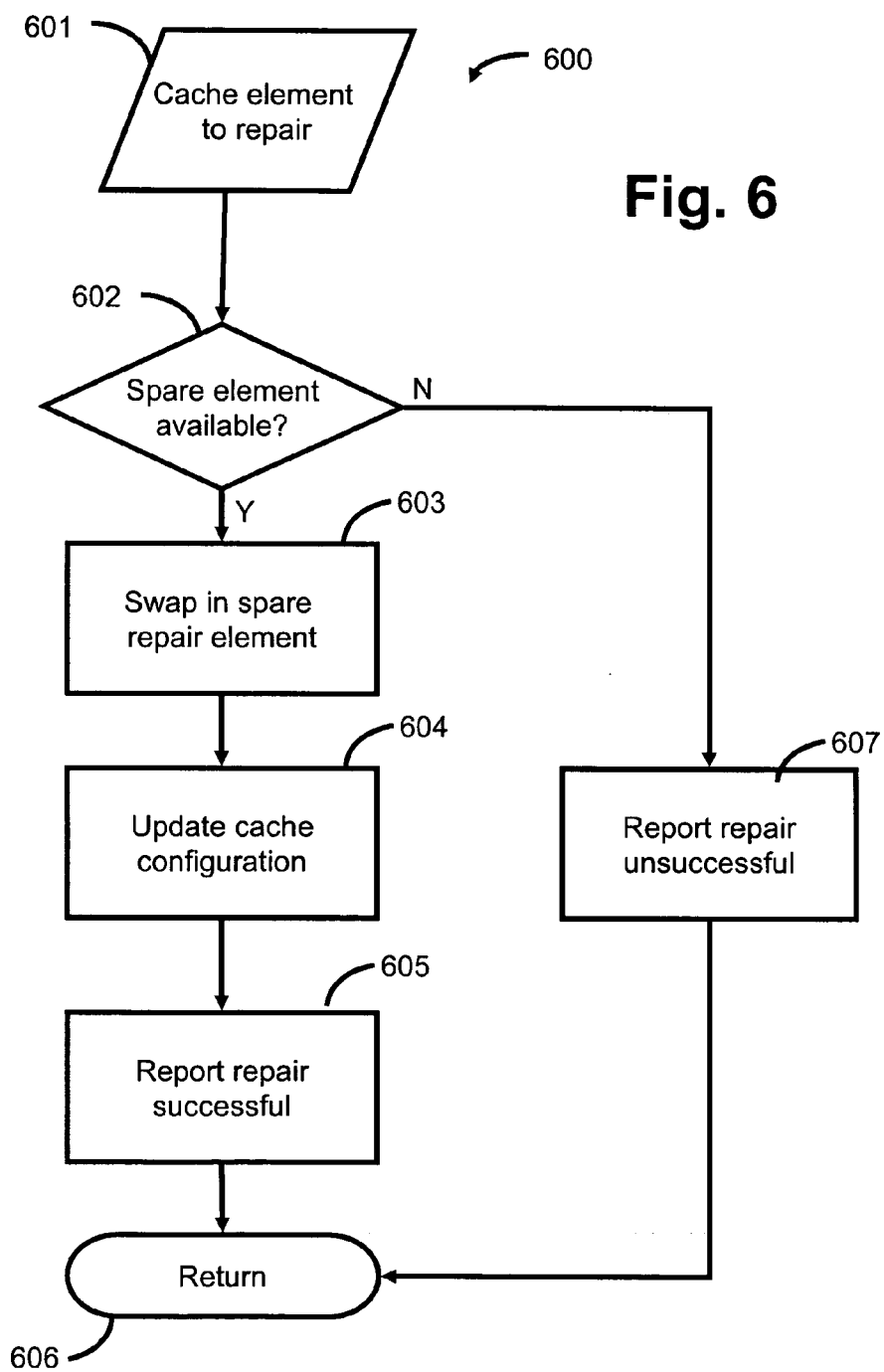

METHODS AND SYSTEMS FOR CONDUCTING PROCESSOR HEALTH-CHECKS

CROSS-REFERENCE TO RELATED APPLICATIONS

This application claims priority from U.S. Provisional application Ser. No. 60/654,273 filed on Feb. 18, 2005.

This application is also related to the following US patent applications:

"Systems and Methods for CPU Repair", Ser. No. 60/254,741, filed Feb. 18, 2005, and Ser. No. 60/654,741, filed Feb. 18, 2005 having the same title;

"Systems and Methods for CPU Repair", Ser. No. 60/254,259, filed Feb. 18, 2005, and Ser. No. 60/654,259, filed Feb. 18, 2005 having the same title;

"Systems and Methods for CPU Repair", Ser. No. 60/254,255, filed Feb. 18, 2005, and Ser. No. 60/654,255, filed Feb. 18, 2005 having the same title;

"Systems and Methods for CPU Repair", Ser. No. 60/254,272, filed Feb. 18, 2005, and Ser. No. 60/654,272, filed Feb. 18, 2005 having the same title;

"Systems and Methods for CPU Repair", Ser. No. 60/254,256, filed Feb. 18, 2005, and Ser. No. 60/654,256, filed Feb. 18, 2005 having the same title;

"Systems and Methods for CPU Repair", Ser. No. 60/254,740, filed Feb. 18, 2005, and Ser. No. 60/654,740, filed Feb. 18, 2005 having the same title;

"Systems and Methods for CPU Repair", Ser. No. 60/254,739, filed Feb. 18, 2005, and Ser. No. 60/254,739, filed Feb. 18, 2005 having the same title;

"Systems and Methods for CPU Repair", Ser. No. 60/254,258, filed Feb. 18, 2005, and Ser. No. 60/654,258, filed Feb. 18, 2005 having the same title;

"Systems and Methods for CPU Repair", Ser. No. 60/254,744, filed Feb. 18, 2005, and Ser. No. 60/654,744, filed Feb. 18, 2005 having the same title;

"Systems and Methods for CPU Repair", Ser. No. 60/254,743, filed Feb. 18, 2005, and Ser. No. 60/654,743, filed Feb. 18, 2005 having the same title; and "Methods and Systems for Conducting Processor Health-Checks", Ser. No. 60/254,203, filed Feb. 18, 2005, and Ser. No. 60/654,603, filed Feb. 18, 2005 having the same title;

which are fully incorporated herein by reference.

BACKGROUND

At the heart of many computer systems is the microprocessor or central processing unit (CPU) (referred to collectively as the "processor.") The processor performs most of the actions responsible for application programs to function. The execution capabilities of the system are closely tied to the CPU: the faster the CPU can execute program instructions, the faster the system as a whole will execute.

Early processors executed instructions from relatively slow system memory, taking several clock cycles to execute a single instruction. They would read an instruction from memory, decode the instruction, perform the required activity, and write the result back to memory, all of which would take one or more clock cycles to accomplish.

As applications demanded more power from processors, internal and external cache memories were added to processors. A cache memory (hereinafter cache) is a section of very fast memory located within the processor or located external to the processor and closely coupled to the processor. Blocks of instructions or data are copied from the relatively slower system memory (DRAM) to the faster cache memory where they can be quickly accessed by the processor.

Cache memories can develop persistent errors over time, which degrade the operability and functionality of their associated CPU's. In such cases, physical removal and replacement of the failed or failing cache memory has been performed. Moreover, where the failing or failed cache memory is internal to the CPU, physical removal and replacement of the entire CPU module or chip has been performed. This removal process is generally performed by field personnel and results in greater system downtime.

Some computer systems use multiple CPUs concurrently. If a CPU fails during operation, it can cause severe problems for the applications that are running at the time of failure. Accordingly, it is desirable to determine how healthy each CPU is in order to remove unhealthy CPUs before they fail.

SUMMARY

In one embodiment, a method for evaluating the status of a processor is provided. The method includes, for example, the steps of initializing and executing an operating system, de-allocating the processor from the available pool or system resources and performing a health-check on the processor while the operating system is executing.

BRIEF DESCRIPTION OF THE DRAWINGS

FIG. 6 is a flow chart of one embodiment of a CPU repair process.

DETAILED DESCRIPTION

The following includes definition of exemplary terms used throughout the disclosure. Both singular and plural forms of all terms fall within each meaning:

"Logic", as used herein includes, but is not limited to, hardware, firmware, software and/or combinations of each to perform a function(s) or an action(s). For example, based on a desired application or needs, logic may include a software controlled microprocessor, discrete logic such as an application specific integrated circuit (ASIC), or other programmed logic device. Logic may also be fully embodied as software.

"Cache", as used herein includes, but is not limited to, a buffer or a memory or section of a buffer or memory located within a processor ("CPU") or located external to the processor and closely coupled to the processor.

"Cache element", as used herein includes, but is not limited to, one or more sections or sub-units of a cache.

"CPU", as used herein includes, but is not limited to, any device, structure or circuit that processes digital information including for example, data and instructions and other information. This term is also synonymous with processor and/or controller.

"Cache management logic", as used herein includes, but is not limited to, any logic that can store, retrieve, and/or process data for exercising executive, administrative, and/or supervisory direction or control of caches or cache elements.

"During", as used herein includes, but is not limited to, in or throughout the time or existence of; at some point in the entire time of; and/or in the course of.

Figure 1:
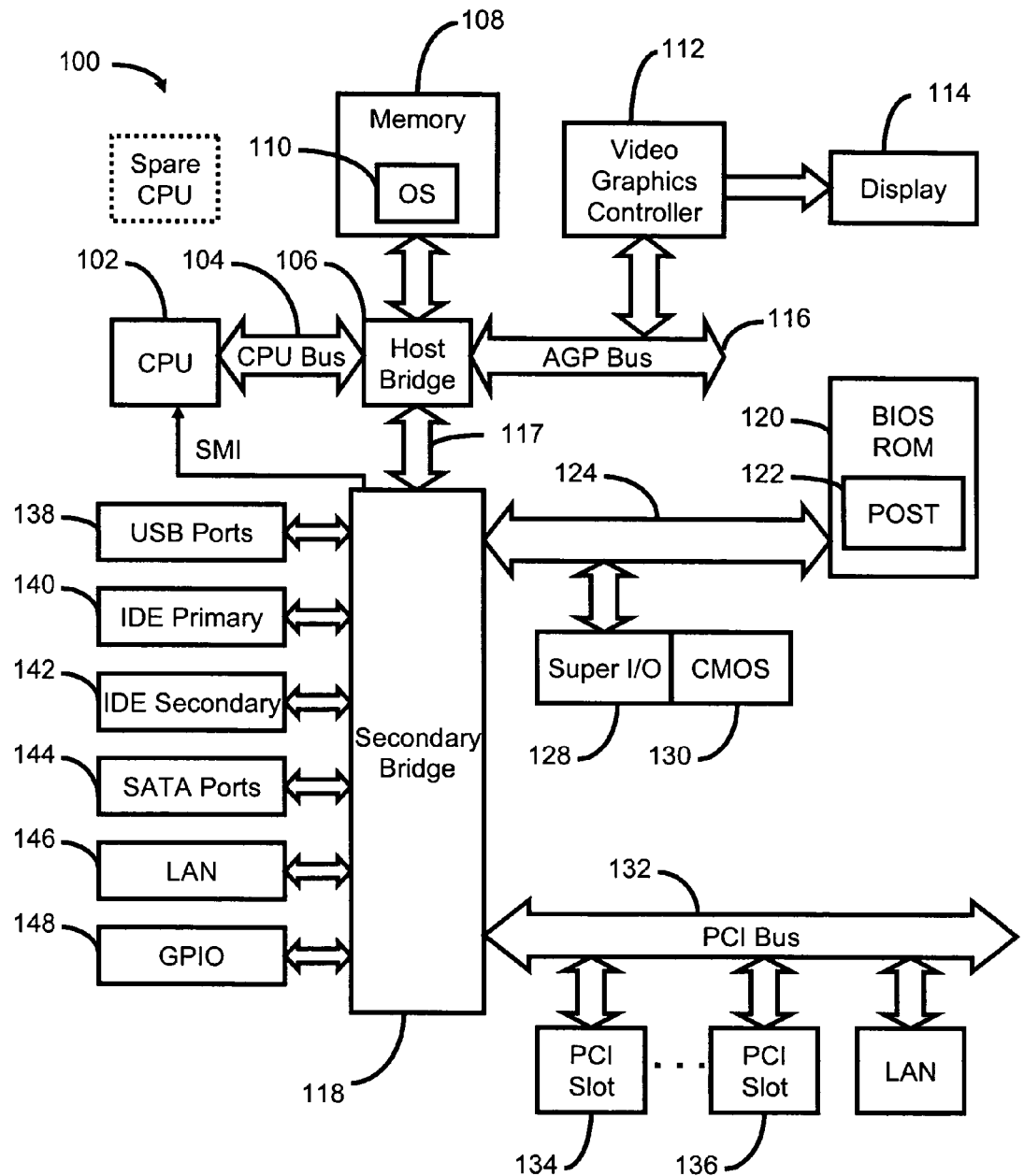
FIG. 1 is an exemplary overall system diagram.

Referring now to FIG. 1, a computer system 100 constructed in accordance with one embodiment generally includes a central processing unit ("CPU") 102 coupled to a host bridge logic device 106 over a CPU bus 104. CPU 102 may include any processor suitable for a computer such as, for example, a Pentium or Centrino class processor provided by Intel. A system memory 108, which may be is one or more synchronous dynamic random access memory ("SDRAM") devices (or other suitable type of memory device), couples to host bridge 106 via a memory bus. Further, a graphics controller 112, which provides video and graphics signals to a display 114, couples to host bridge 106 by way of a suitable graphics bus, such as the Advanced Graphics Port ("AGP") bus 116. Host bridge 106 also couples to a secondary bridge 118 via bus 117.

A display 114 may be a Cathode Ray Tube, liquid crystal display or any other similar visual output device. An input device is also provided and serves as a user interface to the system. As will be described in more detail, input device may be a light sensitive panel for receiving commands from a user such as, for example, navigation of a cursor control input system. Input device interfaces with the computer system's I/O such as, for example, USB port 138. Alternatively, input device can interface with other I/O ports.

Secondary Bridge 118 is an I/O controller chipset. The secondary bridge 118 interfaces a variety of I/O or peripheral devices to CPU 102 and memory 108 via the host bridge 106. The host bridge 106 permits the CPU 102 to read data from or write data to system memory 108. Further, through host bridge 106, the CPU 102 can communicate with I/O devices on connected to the secondary bridge 118 and, and similarly, I/O devices can read data from and write data to system memory 108 via the secondary bridge 118 and host bridge 106. The host bridge 106 may have memory controller and arbiter logic (not specifically shown) to provide controlled and efficient access to system memory 108 by the various devices in computer system 100 such as CPU 102 and the various I/O devices. A suitable host bridge is, for example, a Memory Controller Hub such as the Intel® 875P Chipset described in the Intel® 82875P (MCH) Datasheet, which is hereby fully incorporated by reference.

Referring still to FIG. 1, secondary bridge logic device 118 may be an Intel® 82801EB I/O Controller Hub 5 (ICH5)/Intel® 82801ER I/O Controller Hub 5 R (ICH5R) device provided by Intel and described in the Intel® 82801EB ICH5/82801ER ICH5R Datasheet, which is incorporated herein by reference in its entirety. The secondary bridge includes various controller logic for interfacing devices connected to Universal Serial Bus (USB) ports 138, Integrated Drive Electronics (IDE) primary and secondary channels (also known as parallel ATA channels or sub-system) 140 and 142, Serial ATA ports or sub-systems 144, Local Area Network (LAN) connections, and general purpose I/O (GPIO) ports 148. Secondary bridge 118 also includes a bus 124 for interfacing with BIOS ROM 120, super I/O 128, and CMOS memory 130. Secondary bridge 118 further has a Peripheral Component Interconnect (PCI) bus 132 for interfacing with various devices connected to PCI slots or ports 134-136. The primary IDE channel 140 can be used, for example, to couple to a master hard drive device and a slave floppy disk device (e.g., mass storage devices) to the computer system 100. Alternatively or in combination, SATA ports 144 can be used to couple such mass storage devices or additional mass storage devices to the computer system 100.

The BIOS ROM 120 includes firmware that is executed by the CPU 102 and which provides low level functions, such as access to the mass storage devices connected to secondary bridge 118. The BIOS firmware also contains the instructions executed by CPU 102 to conduct System Management Interrupt (SMI) handling and Power-On-Self-Test ("POST") 122. POST 102 is a subset of instructions contained with the BIOS ROM 102. During the boot up process, CPU 102 copies the BIOS to system memory 108 to permit faster access.

The super I/O device 128 provides various inputs and output functions. For example, the super I/O device 128 may include a serial port and a parallel port (both not shown) for connecting peripheral devices that communicate over a serial line or a parallel pathway. Super I/O device 108 may also include a memory portion 130 in which various parameters can be stored and retrieved. These parameters may be system and user specified configuration information for the computer system such as, for example, a user-defined computer set-up or the identity of bay devices. The memory portion 130 in National Semiconductor's 97338VJG is a complementary metal oxide semiconductor ("CMOS") memory portion. Memory portion 130, however, can be located elsewhere in the system.

Figure 2:
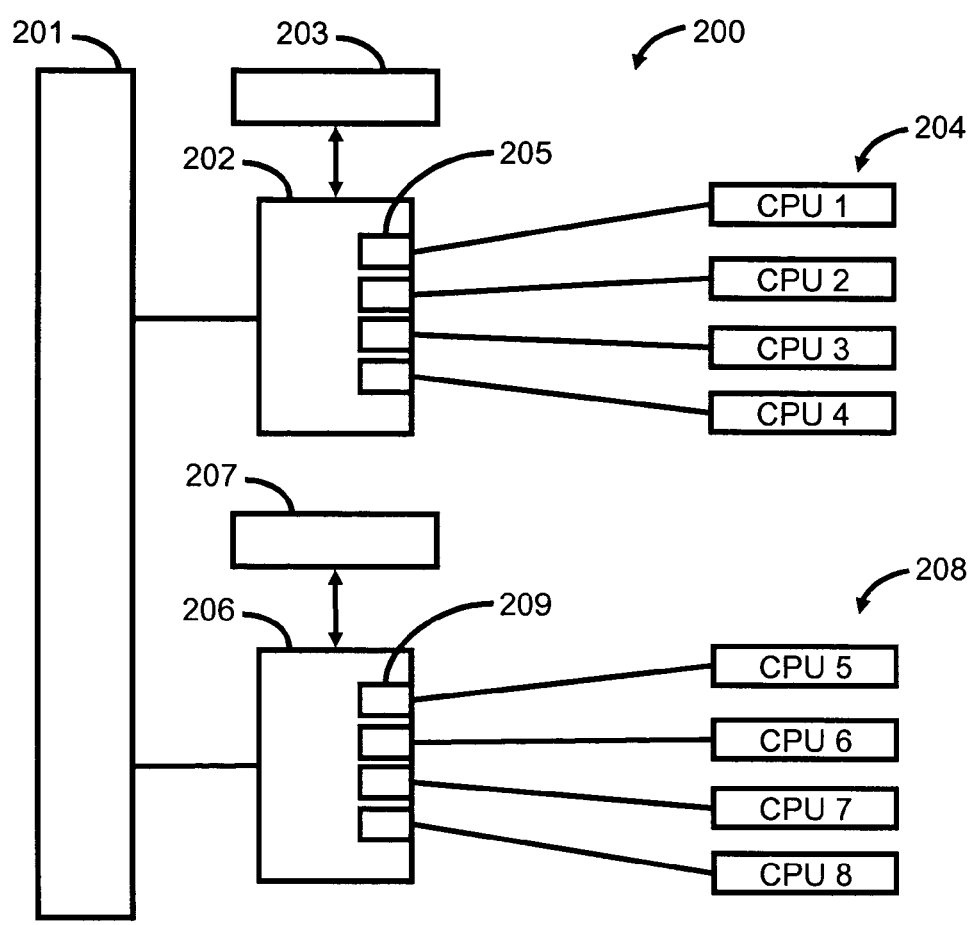
FIG. 2 is a block diagram of one embodiment of a CPU health-check system

Referring to FIG. 2, a block diagram of a CPU health-check system 200 in accordance with one embodiment is shown. An optional system crossbar 201 allows the different agent branches and hardware to be connected. An agent branch is referred to herein as a set or group of components (both hardware and software) connected to a particular agent chip (the agent chip itself is considered part of the agent branch). For example, as shown in FIG. 2, an agent branch would include a first agent chip 202, a local memory 203 and a set of CPUs 204. The crossbar 201 of FIG. 2 connects two agent branches, one associated with the first agent chip 202 and one associated with the second agent chip 206. Agent chips are devices used to physically, electrically and programmatically connect a set of CPUs and memory to the operating system 110 of a computer system 100.

The first agent chip 202 is connected to a local memory 203 and a set of CPUs 204. The local memory 203 includes DIMMS and processor dependent hardware which is the hardware need to physically connect each the local memory 203 to the specific processors or agents used. In the embodiment shown in FIG. 2, there are four CPUs (CPU 1-4) connected to first agent chip 1, however more or less CPUs may be connected to the first agent chip.

Each CPU in set 204 is connected to a dedicated processor interface 205 on the first agent chip 202. Each processor interface 205 may be selectively turned "on" and "off" to isolate the connected CPU from the rest of the system.

Connected to the first agent branch through the crossbar 201 is a second agent branch. The second agent branch is essentially identical to the first agent branch. The second agent branch comprises a second agent chip 206 having a local memory 207. Like local memory 203 of the first agent chip 202, local memory 207 includes DIMMS and processor dependent hardware.

The second agent chip 206 is also shown having a second set 208 of CPUs connected thereto. FIG. 2 shows four CPUs (CPUs 5-8) connected to the second agent chip 206. It is understood that more or less CPUs may be connected therefore depending on the requirements and characteristics of the computer system 100. Each CPU in set 208 is connected to a dedicated processor interface 209 which may be selectively turned "on" and "off" to isolate the connected CPU from the rest of the system.

The embodiment shown in FIG. 2 connects each CPU to the agent chip through a dedicated processor interface 205, 209. Other methods of connecting the CPUs to the agent chips are also possible.

Figure 3:
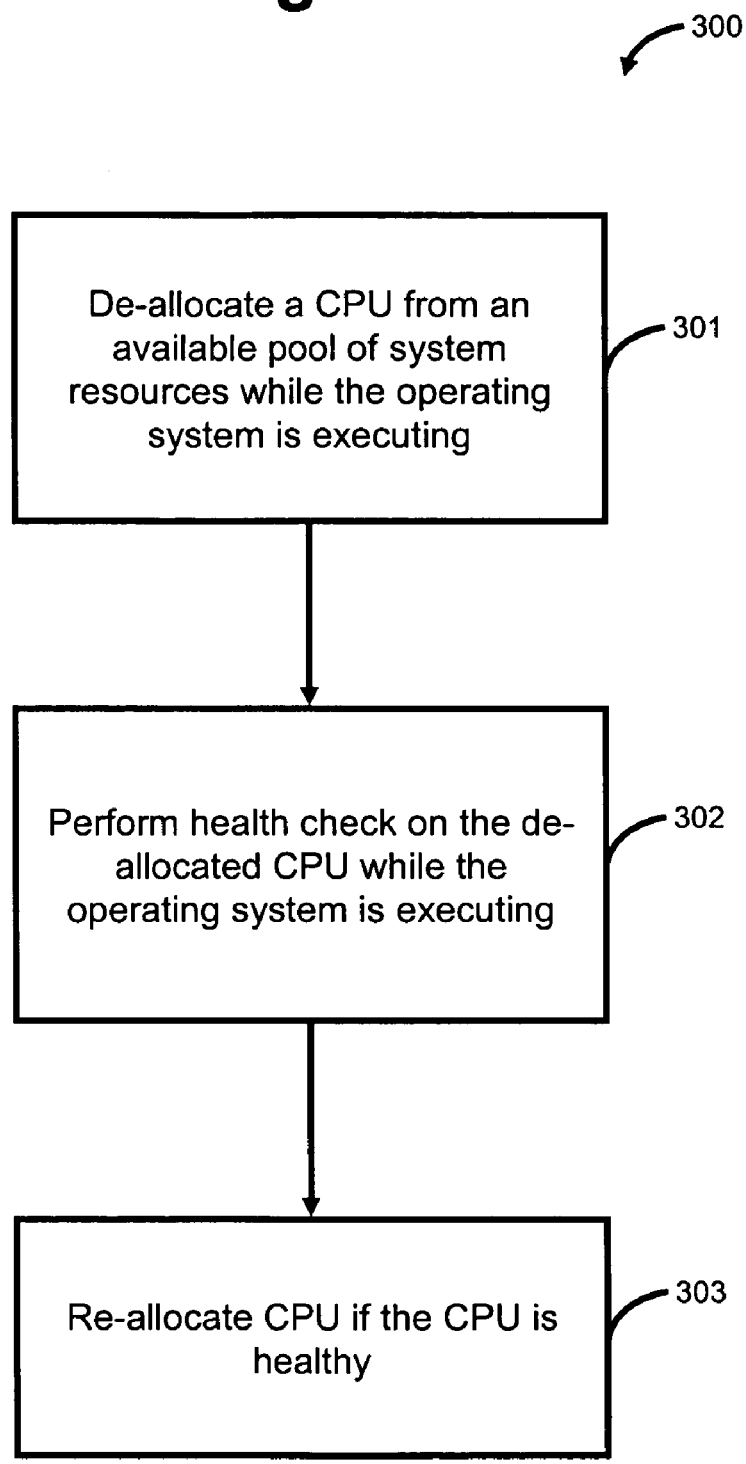
FIG. 3 is a high-level flowchart of one embodiment of health-check logic.

Now referring to FIG. 3, a high level flow chart 300 of an exemplary process of the health-check logic is shown. The rectangular elements denote "processing blocks" and represent computer software instructions or groups of instructions. The diamond shaped elements denote "decision blocks" and represent computer software instructions or groups of instructions which affect the execution of the computer software instructions represented by the processing blocks. Alternatively, the processing and decision blocks represent steps performed by functionally equivalent circuits such as a digital signal processor circuit or an application-specific integrated circuit (ASIC). The flow diagram does not depict syntax of any particular programming language. Rather, the flow diagram illustrates the functional information one skilled in the art may use to fabricate circuits or to generate computer software to perform the processing of the system. It should be noted that many routine program elements, such as initialization of loops and variables and the use of temporary variables are not shown.

A health-check refers generally, but is not limited to, the monitoring, managing, handling, storing, evaluating and/or repairing of CPUs including, for example, their cache elements and/or their corresponding cache element errors. Health-check logic can be divided up into different programs, routines, applications, software, firmware, circuitry and algorithms such that different parts of the health-check logic can be stored and run from various different locations within the computer system 100. For example, health-check logic may be included in the operating system 110. In other words, the implementation of the health-check logic can vary.

The health-check logic begins, while the operating system on the computer is executing, by de-allocating a CPU from the available pool of system resources (step 301). The selection process can be random or performed at some appropriate configurable frequency. The de-allocated CPU is then subjected to a health-check (step 302). A health-check generally refers to any type of testing done to determine whether the CPU is operating properly. If, following the health-check, the health-check logic determines that the CPU is healthy (i.e. performing properly), the CPU is re-allocated into the available pool of system resources (step 303).

Figure 4:
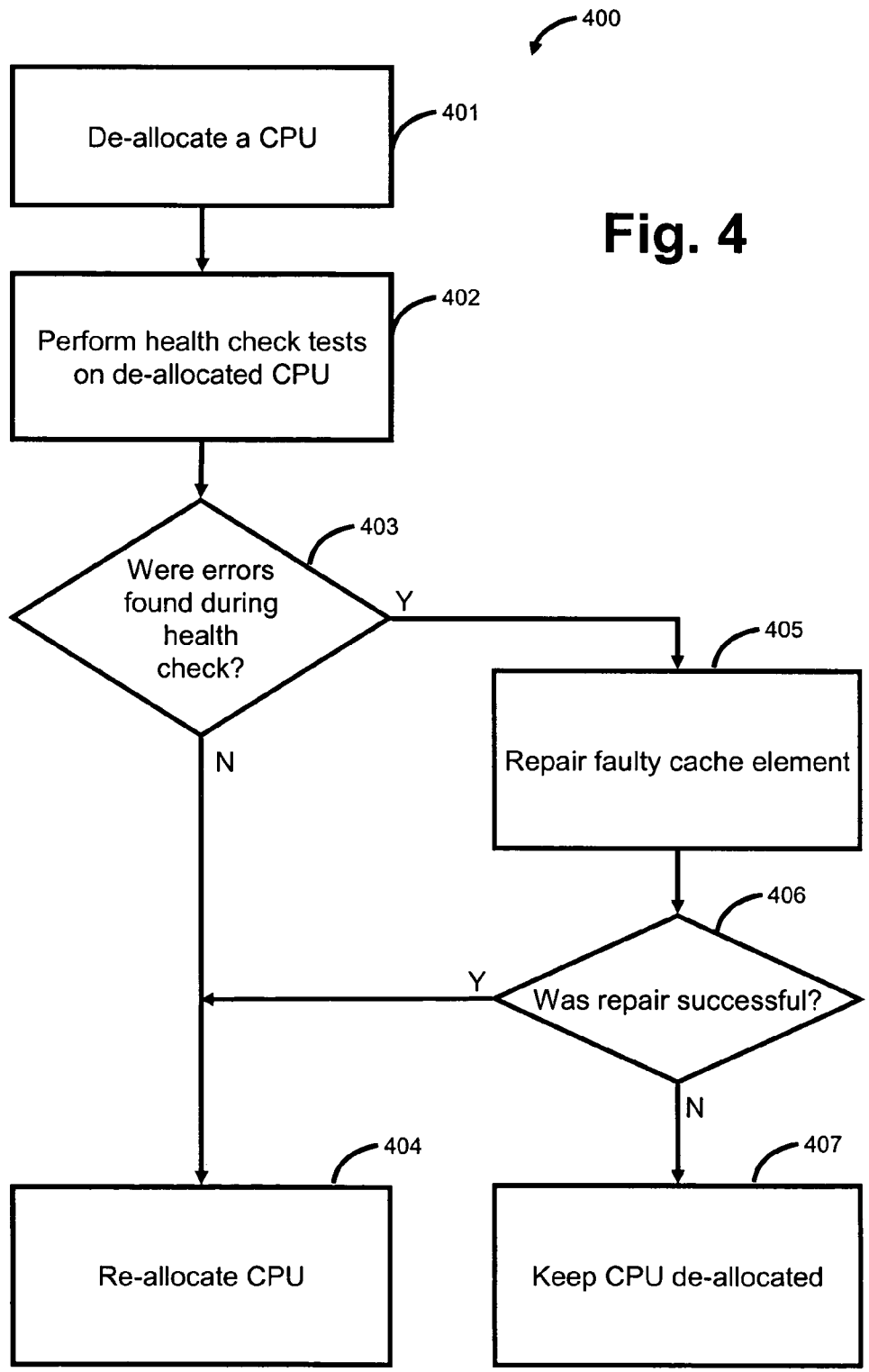
FIG. 4 is a flow chart of another embodiment of health-check logic.

Now referring to FIG. 4, an exemplary process of the health-check logic is shown in the form of a flow chart 400. The computer system 100 includes a health-check logic which selects a specific CPU for a health-check. The selection process is controlled by the health-check logic and is performed at some appropriate configurable frequency. For example, the health-check logic may select one CPU per week and rotate through each of the CPUs (CPU 1 on week 1, CPU 2 on week 2 and so on). However, depending on the configuration of the computer system 100, certain CPUs may need to be check more frequently than others. Therefore, the selection process may be tailored to the requirements of the computer system 100 and may be altered as needed.

After selecting a CPU for a health-check, the health-check logic de-allocates the CPU from the operating system and the available pool of system resources (step 401). The health-check logic may optionally de-allocate the dedicated processor interface 205, 209 corresponding to the selected CPU. Additionally, if the computer system 100 has a spare CPU that is available, the spare CPU may be logically inserted by the health-check logic for the de-allocated CPU if there is a need to maintain a constant number of CPUs in the available pool of system resources during the health-check.

After de-allocating the selected CPU from the pool of system resources, the health-check logic obtains control over the de-allocated CPU. A health-check is then performed on the de-allocated CPU (step 402). The health-check begins by having the health-check logic read the CPU error logs. The health-check logic reads all errors contained in the CPU error logs. These include but is not limited to, for example, errors caused by an illegal snoop response, parity bit errors, hard fails, unexpected delays, read errors, write errors, ECC errors, cache data errors, cache tag errors, and bus errors. Sometimes, the cause of the error is based on the cache element itself mishandling information or operating improperly when called upon to store/recall information. These types of errors are referred to generally as cache element errors or cache errors. The read error logs are stored in a memory and are then cleared from the CPU. After having the CPU's error logs cleared, the health-check logic tests the CPU.

The testing may be done by starting the CPU BIST (Built-In Self-Test) engines or by having the health-check logic run worst-case tests on the CPU. If the CPU BIST engines are used, the health-check logic programmatically starts the BIST engine. Generally, the CPU BIST engines are only started during a system boot-up. However, since the CPU has been de-allocated, the health-check logic may start the CPU BIST engines while the computer system 100 is up and running its operating system. Alternatively, the health-check logic runs designed tests or worst-case tests to determine if the CPU is operating properly. The type of test run may vary and may be generic or specially designed for the specific CPU.

After the testing procedure is completed, the CPU's error logs are again read by the health-check logic to determine if any error occurred during testing (step 403). Testing may be considered completed after a predetermined amount of time or after the test program reports that it is completed. If after reading the CPU's error logs following testing there are no errors in the CPU's error logs, the health-check logic assumes that the CPU is healthy and subsequently reports and records that a health-check has been performed on the CPU and that the CPU is operating properly. The CPU is then re-allocated and returned to the available pool of system resources (step 403).

However, if errors are found in the error logs of the CPU following testing, the health-check logic concludes that the CPU is not performing properly (a faulty CPU). The health-check logic reports that errors were found. Furthermore, the health-check logic reports the error codes found in the error logs and which cache elements incurred the error and thus need to be replaced. The health-check logic may then attempt to repair the cache elements within the CPU that caused the errors (step 405). The repair process is described in further detail below with respect to FIGS. 5-6.

The health-check logic then determines if the cache element repair performed successfully (step 406). As described in further detail with respect to FIG. 6, a repair is deemed successful if the faulty cache element is swapped out for an available non-allocated (or spare) cache element. If the repair was successful, the health-check logic re-allocates the CPU to the available pool of system resources (step 404). However, if the repair was not successful, the health-check logic keeps the CPU de-allocated (step 407).

Figure 5:
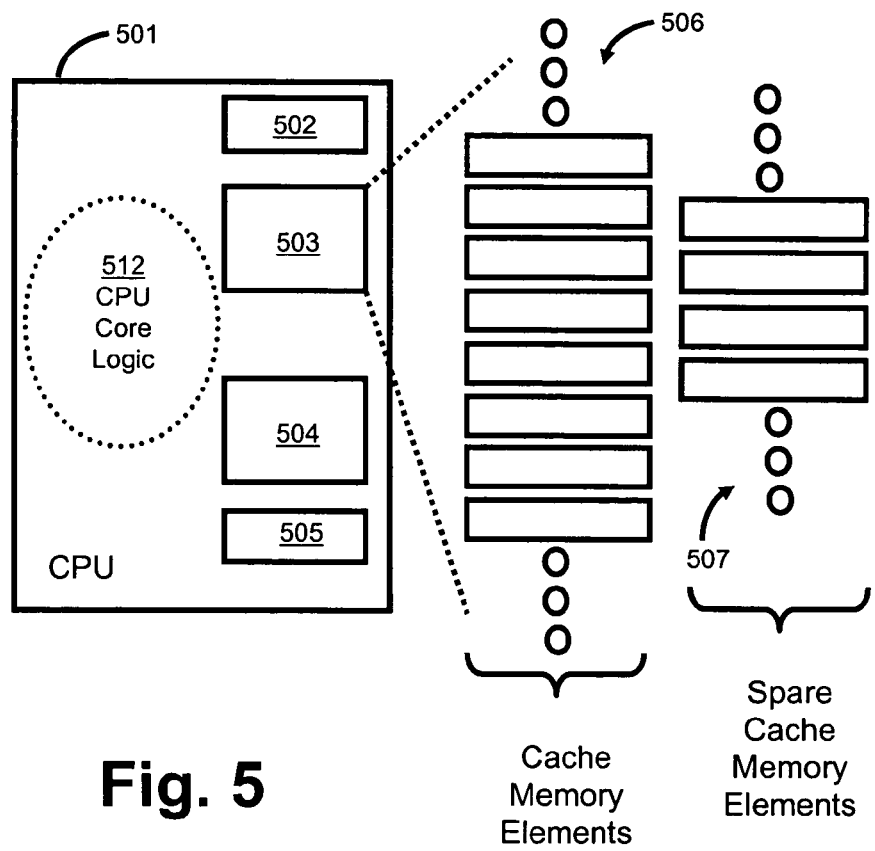
FIG. 5 is an exemplary partial block diagram of one embodiment of a CPU.

Referring to FIG. 5, one embodiment of a CPU is shown that may be used in the health-check system of FIG. 2. CPU 501 may include various types of cache areas 502, 503, 504, 505. The types of cache area may include, but is not limited to, D-cache elements, I-cache elements, D-cache element tags, and I-cache element tags. The specific types of cache elements are not critical.

Within each cache area 502, 503, 504, 505 are at least two subsets of elements. For example, FIG. 5 shows the two subsets of cache elements for cache area 503. The first subset includes data cache elements 506 that are initially being used to store data. The second subset includes spare cache elements 507 that are identical to the data cache elements 506, but which are not initially in use. When the CPU cache areas are constructed, a wafer test is applied to determine which cache elements are faulty. This is done by applying multiple voltage extremes to each cache element to determine which cache elements are operating correctly. If too many cache elements are deemed faulty, the CPU 501 is not installed in the computer system 100. At the end of the wafer test, but before the CPU 501 is installed in the computer system 100, the final cache configuration is laser fised in the CPU 501. Thus, when the computer system 100 is first used, the CPU 501 has permanent knowledge of which cache elements are faulty and is configured in such a way that the faulty cache elements are not used.

As such, the CPU 501 begins with a number of data cache elements 506 that have passed the wafer test and are currently used by the CPU. In other words, the data cache elements 506 that passed the wafer test are initially presumed to be operating properly and are thus initially used or allocated by the CPU 501. Similarly, the CPU 501 begins with a number of spare or non-allocated cache elements 507 that have passed the wafer test and are initially not used, but are available to be swapped in for data cache elements 306 that become faulty.

Also included in the CPU 501 is core logic 512. The CPU 501 may be connected to additional memory through an interface. The interface allows the CPU 501 to communicate with and share information with other memory in the computer system 100.

When the CPU contains errors following health-check testing, the health-check logic may attempt to repair the specific cache elements which are causing the errors (faulty cache elements). Essentially, the health-check logic may "swap in" a spare cache element (non-allocated cache element) for a faulty cache element. "Swapping in" refers generally to the reconfiguration and re-allocation within the computer system 100 and its memory such that the computer system 100 recognizes and utilizes a spare (or swapped in) component in place of the faulty (or de-allocated) component, and no longer utilizes the faulty (or de-allocated) component. The "swapping in" process for cache elements may be accomplished, for example, by using associative addressing. More specifically, each spare cache element has an associative addressing register and a valid bit associated with it. To repair a faulty cache element, the address of the faulty cache element is entered into the associative address register on one of the spare cache elements, and the valid bit is turned on. The hardware may then automatically access the replaced element rather than the original cache element.

Referring to FIG. 6, a flow chart of one embodiment of a CPU repair process 600 is illustrated. As discussed above, following the health-check testing, certain cache elements may be causing errors in the CPU. The cache element repair information is sent to the repair process 600. In the embodiment shown in FIG. 4, the repair process 600 is a sub-routine of the health-check logic 400, though this does not have to be the case. The cache element repair information is input into the repair process subroutine (step 601). The repair information may include, but is not limited to, the location of the faulty cache element, cache configuration, and cache element error history.

The repair process then determines whether a spare (non-allocated) cache element is available to be swapped in for the fault cache element (step 602). In making this determination, the logic may utilize any spare cache element 507 that is available. In other words, there is no predetermined or pre-allocated spare cache element 507 for a particular cache element 506. Any available spare cache element 507 may be swapped in for any cache element 506 that becomes faulty. If a spare cache element is available, the spare cache element is swapped in for the faulty cache element (step 603). A spare cache element may be swapped in for a previously swapped in spare cache element that has become faulty. Hereinafter, such swapping refers to any process by which the spare cache element is mapped for having data stored therein or read therefrom in place of the faulty cache element. In one embodiment, this can be accomplished by de-allocating the faulty cache element and allocating the spare cache element in its place.

Once the spare cache element has been swapped in for the faulty cache element, the cache configuration is updated in a memory at step 604. Once updated, the repair process reports that the cache element repair was successful (step 605) and returns (step 606) to step 406.

If, however, it is determined at step 602 that a spare cache element is not available, the repair process reports that the cache element repair was unsuccessful (step 607) and returns (step 606) to step 406.

The repair process may be performed while the operating system in the computer is executing. Since the CPU is de-allocated, no applications running on the operating system will be affected by the cache element repair process. Alternatively, the repair process may be performed during a system reboot. In that case, once the repair process determines that a spare cache element is available (step 602), a system reboot is scheduled and generated. During the reboot procedure, the remaining steps (603-606) may be carried out and the repaired CPU may be re-allocated to the available pool of system resources following system reboot.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. For example, the number of spare cache elements, spare CPUs, and the definition of a faulty cache or memory can be changed. Therefore, the inventive concept, in its broader aspects, is not limited to the specific details, the representative apparatus, and illustrative examples shown and described. Accordingly, departures may be made from such details without departing from the spirit or scope of the applicant's general inventive concept.

What is claimed is:

1. A method for evaluating the status of a processor comprising the steps of:
    initializing and executing an operating system;
    de-allocating said processor from an available pool of system resources while said operating system is executing; and
    conducting a health-check on said processor while said operating system is executing, said health check comprising:
        reading error logs of said processor;
        storing data from said error logs in a memory;

clearing said error logs;
conducting at least one diagnostic test on said processor; and
reading said error logs following said at least one diagnostic test;
wherein said processor is determined to be unhealthy if errors are contained in said error logs following said at least one diagnostic test.

2. The method of claim 1 further comprising the step of: swapping in a non-allocated processor for said de-allocated processor.

3. The method of claim 1 further comprising the step of: reporting actions taken on a memory device.

4. The method of claim 1 wherein said at least one diagnostic test includes conducting at least one cache memory diagnostic test on said processor.

5. The method of claim 1 wherein said at least one diagnostic test is conducted by starting at least one of the processor's BIST engines.

6. The method of claim 1 wherein said processor is determined to be healthy if no errors are contained in said error logs following said at least one diagnostic test.

7. The method of claim 1 further comprising re-allocating said processor into said available pool of system resources if said processor is healthy.

8. The method of claim 1 further comprising the step of initiating a cache memory repair request.

9. A system comprising:
at least one CPU; and
health-check logic operable to de-allocate said at least one CPU from an available pool of system resources and conduct a health-check on said processor while an operating system is executing, said health-check logic being operable to read error logs of said at least one CPU, store data from said error logs in a memory, clear said error logs, conduct at least one diagnostic test on said at least one CPU, and read said error logs following said at least one diagnostic test.

10. The system of claim 9 wherein said health-check logic is further operable to swap in a non-allocated CPU for said at least one de-allocated CPU.

11. The system of claim 9, wherein said health-check logic is further operable to report actions taken on a memory device.

12. The system of claim 9 wherein said at least one diagnostic test includes conducting at least one cache memory diagnostic test on said at least one CPU.

13. The system of claim 9 wherein said at least one diagnostic test is conducted by starting said at least one CPU's at least one BIST engine.

14. The system of claim 9 wherein said health-check logic is further operable to determine that said de-allocated at least one CPU is healthy if no errors are contained in said error logs following said at least one diagnostic test.

15. The system of claim 9 wherein said health-check logic is further operable to determine that said de-allocated at least one CPU is unhealthy if errors are contained in said error logs following said at least one diagnostic test.

16. The method of claim 9 further comprising logic operable to re-allocate said processor into said available pool of system resources if said processor is healthy.

17. A computer system comprising:
at least one processor; and
health-check logic operable to de-allocate said at least one processor from an available pool of system resources and conduct a health-check on said processor while an operating system is executing, said health check logic being operable to read error logs of said at least one processor, store data from said error logs in a memory, clear said error logs, conduct at least one diagnostic test on said at least one de-allocated processor, and read said error logs following said at least one diagnostic test.

18. The computer system of claim 17 wherein said health-check logic is further operable to swap in a non-allocated processor for said at least one de-allocated processor.

19. The computer system of claim 17, wherein said health-check logic is further operable to report actions taken on a memory device.

20. The computer system of claim 17 wherein said testing includes conducting at least one cache memory diagnostic test on said at least one de-allocated processor.

21. The computer system of claim 17 wherein said at least one diagnostic test is conducted by starting said at least one processor's at least one BIST engine.

22. The computer system of claim 17 wherein said health-check logic is further operable to determine that said de-allocated at least one de-allocated processor is healthy if no errors are contained in said error logs following said at least one diagnostic test.

23. The computer system of claim 17 wherein said health-check logic is further operable to determine that said at least one de-allocated processor is unhealthy if errors are contained in said error logs following said at least one diagnostic test.

24. The method of claim 17 further comprising logic operable to re-allocate said processor into said available pool of system resources if said processor is healthy.

25. The method of claim 17 further comprising the step of initiating a cache memory repair request.

26. A method for diagnosing the error status of a processor comprising the steps of:
de-allocating an allocated processor;
clearing error logs of said processor;
conducting at least one diagnostic test on said processor;
reading said error logs following said at least one diagnostic test; and
determining that said processor is healthy if no errors are contained in said error logs following said at least one diagnostic test.

27. The method of claim 26 further comprising the step of: determining that said processor is unhealthy if errors are contained in said error logs following said at least one diagnostic test.

28. The method of claim 26 further comprising the steps of: reading said error logs of said processor before said clearing step; and storing data from said error logs in a memory.

29. The method of claim 26 wherein said testing includes conducting at least one cache memory diagnostic test on said processor.

30. The method of claim 26 wherein said testing is conducted by starting said processor's at least one BIST engine.

* * * * *